(12) United States Patent
Kendall

(10) Patent No.: US 9,643,363 B2
(45) Date of Patent: May 9, 2017

(54) MANUFACTURE OF A STRUCTURAL COMPOSITES COMPONENT

(75) Inventor: Ken Kendall, Gaydon (GB)

(73) Assignee: ASTON MARTIN LAGONDA LIMITED, Gaydon (GB)

( * ) Notice: Subject to any disclaimer, the term of this patent is extended or adjusted under 35 U.S.C. 154(b) by 710 days.

(21) Appl. No.: 13/127,960

(22) PCT Filed: Nov. 5, 2009

(86) PCT No.: PCT/GB2009/002607
§ 371 (c)(1),
(2), (4) Date: Oct. 27, 2011

(87) PCT Pub. No.: WO2010/052457
PCT Pub. Date: May 14, 2010

(65) Prior Publication Data
US 2012/0038081 A1    Feb. 16, 2012

(30) Foreign Application Priority Data
Nov. 5, 2008   (GB) ..................... 0820267

(51) Int. Cl.
*B29C 70/46*  (2006.01)
*B29C 43/18*  (2006.01)
(Continued)

(52) U.S. Cl.
CPC ............ *B29C 70/465* (2013.01); *B29C 43/18* (2013.01); *B29C 33/04* (2013.01); *B29C 33/10* (2013.01);
(Continued)

(58) Field of Classification Search
CPC .................................................... B29C 70/465
(Continued)

(56) References Cited

U.S. PATENT DOCUMENTS

| 6,527,533 B2 | 3/2003 | Dahl et al. |
| 2002/0016121 A1 | 2/2002 | Bjekovic et al. |
| 2009/0004477 A1 | 1/2009 | Malle et al. |

FOREIGN PATENT DOCUMENTS

| CA | 1102066 | * | 6/1981 |
| EP | 0648593 | | 4/1995 |

(Continued)

OTHER PUBLICATIONS

GB Search Report dated Mar. 27, 2009, GB 0820267.3, 2 pages.
International Search Report and Written Opinion dated Apr. 8, 2010, PCT/GB2009/002607, 10 pages.

*Primary Examiner* — Larry Thrower
(74) *Attorney, Agent, or Firm* — Dorsey & Whitney LLP

(57) ABSTRACT

A method of manufacturing a structural composites component in a mold comprising first and second mold halves is provided. The method comprises the steps of providing a fiber or fabric preform, providing a resin layer that is separate from the preform, inserting one of the preform or the resin layer into the first mold half of the mold, then separately inserting the other of the preform or the resin layer into the first mold half such that the one of the preform or the resin layer is disposed on top of the other of the preform or the resin layer in the first mold half. The second mold half is then closed over the first mold half and the mold is pressurized in a compression press to cause the resin film to impregnate the preform, the mold being maintained at a constant temperature throughout the method of manufacture.

21 Claims, 3 Drawing Sheets

(51) Int. Cl.
  *B29C 33/04* (2006.01)
  *B29C 33/10* (2006.01)
  *B29C 43/58* (2006.01)
  *B29K 105/06* (2006.01)

(52) U.S. Cl.
  CPC .. *B29C 2043/5816* (2013.01); *B29K 2105/06* (2013.01)

(58) Field of Classification Search
  USPC .......................................................... 264/257
  See application file for complete search history.

(56) References Cited

FOREIGN PATENT DOCUMENTS

| | | |
|---|---|---|
| GB | 659056 | 10/1951 |
| GB | 2445929 | 7/2008 |
| JP | 62-183317 | 8/1987 |
| JP | 09-123198 | 5/1997 |
| WO | WO 02/072676 | 9/2002 |
| WO | 2008038429 A1 | 4/2008 |
| WO | WO 2008/134369 | 11/2008 |

* cited by examiner

MANUFACTURE OF A STRUCTURAL COMPOSITES COMPONENT

This application is the national stage application of PCT Patent Application No. PCT/GB2009/002607 filed Nov. 5, 2009 and entitled, "Manufacture of a Structural Composites Component," which claims priority to United Kingdom Application No. GB 0820267.3 filed Nov. 5, 2008, both of which are hereby incorporated by reference herein in their entireties The present invention relates to a method of manufacture of a structural composites component and further to a structural composites component.

Composites components have been manufactured for many years using well known processes. These processes fall into three main categories of hand laminating processes, liquid composite moulding processes and compression moulding processes. Hand laminating processes are used to produce low volume structural components and as such are used in the aerospace, marine and motor sport industries. Hand laminating processes include processes such as wet layup, prepreg layup and resin film infusion (RFI). Liquid composite moulding (LCM) techniques are generally used to produce medium volume semi-structural components such as the passenger floor or boot floor of a passenger vehicle. LCM incorporates processes such as liquid resin infusion (LRI), structural reaction injection moulding (SRIM) and resin transfer moulding (RTM). Compression moulding processes are generally used to make non-structural components such as non-load bearing automotive body panels. These processes are high volume processes and include bulk moulding compound (BMC), dough moulding compound (DMC) and sheet moulding compound (SMC).

An example of the low volume hand laminating methods is Resin Film Infusion (RFI). RFI involves the use of expensive woven fabric materials that have a pre-installed layer of resin film incorporated onto the material. The materials are kit cut and hand laid into a mould. The mould must be cool enough for the laying up of the material pieces therein so as to prevent the resin film from flowing prior to complete assembly of the laminate. The mould is then subjected to a vacuum so as to remove air from the fibres in the material. The mould is then heated to lower the viscosity of the resin to allow the resin to infuse though the fibres before the component is cured. The alignment of fibres in the woven fabric mats allows the resin to permeate the fibres relatively easily, resulting in a composites component having a higher volume fraction of fibres; 45% to 55% can be typical. This method of manufacture produces high quality structural components. However, a disadvantage of the process is the laborious, long production time due to the hand-laying up of the material pieces in the mould and the need to cycle the mould from cool to hot and then back to cool each time a part is produced. This process can also be extremely wasteful due to the kit-cutting process. As much as 30%-50% of the fabric/resin material could be wasted in this process.

The medium volume RTM process involves inserting a preformed dry fibre component in a mould and injecting a resin under pressure into the preform in order that the resin binds the fibres together. The fibres and resin are then cured, creating a finished semi-structural component.

The preform is a rigid three dimensional reinforcement preform that may advantageously be produced using an automated system such as that disclosed in U.S. Pat. No. 6,527,533 allowing a high volume production rate of preform components, often of complex geometries, with a good rate of part-to-part consistency. In the automated process, the semi-structural reinforcement preforms are made from a chopped fibre material, e.g. carbon or glass held together by a binder and molded into a pre-determined form and shape of randomly aligned fibres.

During the RTM process, liquid resin is injected into the fibres of the preform under pressure—usually less than 1 MPa. This high pressure is required to advance the resin through the preform, especially in larger components. Hence, the equipment used to inject the resin must be capable of providing such high pressure, and is therefore expensive. The resin must stay liquid for up to 30 minutes such that it can advance through the fibres.

Structural and semi-structural components manufactured using the RTM process can suffer in quality for various reasons. The injection process can produce an effect known as "fibre wash" at higher pressures in which, as it advances, the resin disturbs the fibres within the preform, altering the fibre alignment and creating structural deficiencies within the component. Furthermore, the resin used must be of low enough viscosity at room temperature, firstly so that it can be pumped from a storage tank to the mould and secondly in order that it stays liquid for as long as is required for it to advance through the fibres from one end of the component to the other. This means that the resin cannot contain toughening agents that would otherwise strengthen the resulting composite component, since toughening agents increase the viscosity of the resin. Furthermore, the volume fraction of fibres within the finished component is often as low as 30% due to the low permeability of the randomly aligned fibres of the preform in each of the X, Y and Z planes and the need for the resin to permeate the fibres in three directions.

SMC compression moulding involves firstly forming a charge of material to be moulded on a carrier film. A supply of chopped glass fibres, resin/filler paste and other additives are added onto the carrier film and the resultant mixture is then compacted between rollers to produce the SMC. The material charge is then cut from the SMC and placed into one half of an open mould such that the charge covers approximately 30% to 70% of the mould inner surface. The second half of the mould is then closed over the first half using a compression mould tool, causing the charge to flow until the mould cavity is filled. This action causes multiple advancing flow fronts to meet at 'weld lines' which form areas of weakness in the resulting component due to the absence of fibres across the weld lines.

It is desired to improve current manufacturing techniques to achieve a high volume process that produces high quality structural components in a low cycle time.

According to an embodiment, there is provided a method of manufacturing a structural composites component in a mould comprising first and second mould halves, the method comprising the steps of providing a fibre or fabric preform, providing a resin layer that is separate from the preform, inserting one of the preform or the resin layer into the first mould half, separately inserting the other of the preform or the resin layer into the first mould half such that the one of the preform or the resin layer is disposed on top of the other of the preform or the resin layer in the first mould half, closing the second mould half over the first mould half and pressurising the mould in a compression press to cause the resin film to impregnate the preform, wherein the mould is maintained at a constant temperature throughout the method of manufacture.

Although the preform can be formed of randomly aligned fibres as in a typical medium volume process, the quality of the component approaches that produced by RFI because the resin film needs to permeate primarily though the Z-plane of the fibre preform and much less so through the X and Y planes, thus increasing the volume fraction of fibres in the finished components.

Furthermore, the use of a resin film allows a good quality resin, preferably epoxy, to be used since the liquid resin required for use with the RTM process is rendered unnecessary; the resin film does not need to be pumped into the mould. The resin film is easily handled by a person without the need for injection equipment or robotic handling. The separate resin film also means that the mould need not be cooled during assembly of the preform and resin into the mould, as would be the case if the resin was integral with the preform. The resin film is simply added to the mould by the person assembling the component, separately to adding the fibre preform. Once the mould is closed, the resin film heats up under the elevated mould temperature and the 'melted' resin film impregnates the fibres of the preform. The manufacture time of the component is significantly shorter than for either of the RFI or RTM processes as a result. The resin film may also comprise toughening agents that improve the strength of the resulting composites component as is known in the art.

In an embodiment, the pressurising step may be conducted at a high pressure of between 100-300 MPa.

A surface resin layer may be added to the mould prior to the step of adding the resin layer and preform into the mould. The surface resin layer enables a high quality cosmetic surface to be produced on the mould-facing side of the resulting composite component.

These and other improvements will become apparent to the skilled person upon reading the following description of preferred non-limiting embodiments of the invention with reference to the accompanying drawings, in which.

Figure 1:
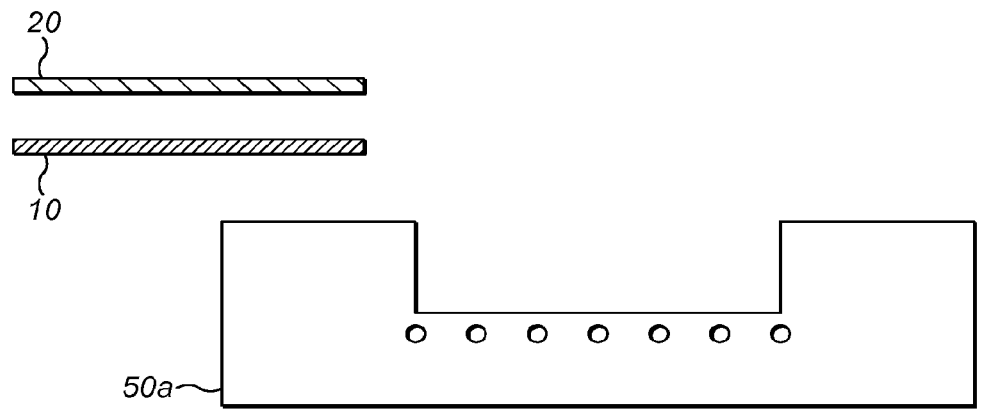
FIG. 1 shows a schematic representation of a net-shape preform, separate resin layer and mould used in the method according to an embodiment.

FIG. 1 shows a schematic view of a net-shape preform 10 and a separate layer of resin film 20, prior to their assembly in one half 50a of a mould. The net-shape preform 10 consists of low cost structural carbon fibre strands and a binder. There are a number of ways of manufacturing the preform, one of which is to have the preform 'tailor made' as will be understood by the skilled person. The preform can alternatively be manufactured using an automated robotic and computer controlled process such as that described in U.S. Pat. No. 6,527,533. In this process, the fibres and binder are applied to a screen. The ingredients are then compacted and subjected to a stream of hot air that melts the binder. The compacted preform is then cooled to freeze the binder and to rigidise the preform. The fibre preform is then removed from the mould, ready for manufacture into a structural composite component. High volumes of fibre preforms can be produced in this manner, often of complex shapes, without incurring any waste fibre material.

The resin film 20 comprises a carbon epoxy thermosetting resin with added toughening agents such as are known to the skilled person. The toughening agents improve the structural quality of the finished composites component in comparison with the liquid resins used in the RTM process. It is for this reason that the toughening agents cannot be used in the RTM process—the viscosity of the liquid resin is not normally low enough to stay liquid for the necessary period of time for the resin to flow though the fibres.

Figure 1A:
FIG. 1a shows a schematic representation of the fibre pre-form placed in the mould with the separate resin layer outside of the mould.
Figure 1A:
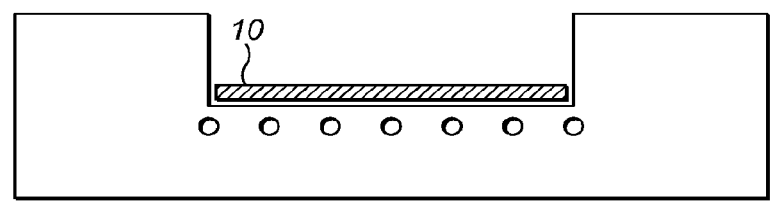
Figure 2:
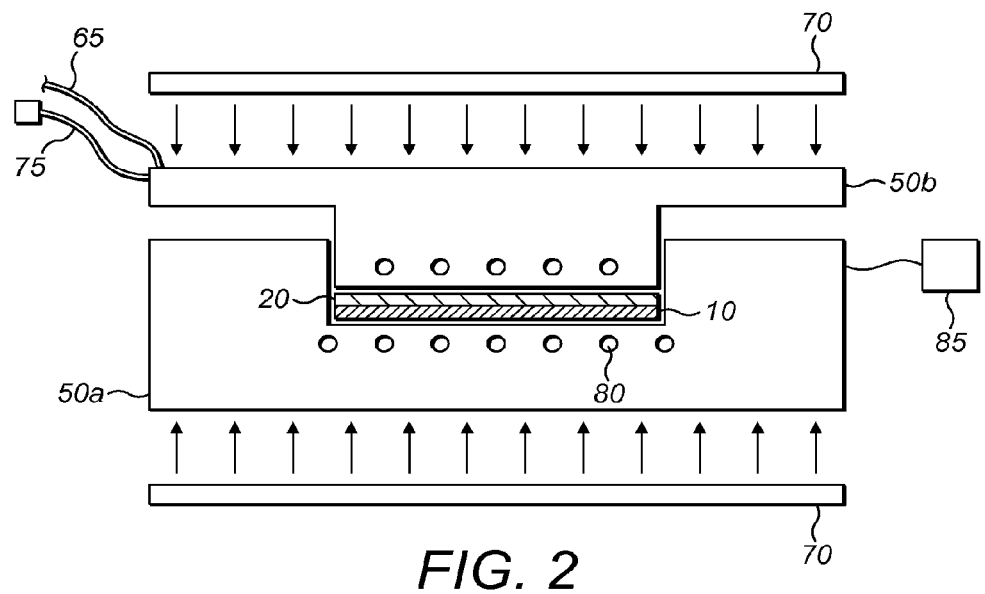
FIG. 2 is a schematic representation of a first embodiment of the invention in which the net-shape preform has been inserted into the mould prior to inserting the separate resin layer into the mould.

In a first embodiment seen in FIG. 2, the mould is a matched mould consisting of matched mould halves 50a and 50b. The mould cavity is specifically shaped for the component to be made. The fibre preform 10 is firstly added to the mould 50a as shown in FIG. 1a. The resin film 20 is added to the mould separately. As it is supplied in film form on a roll, the film can be cut to size and draped on top of the fibre preform. For complex component shapes, strips of the resin film can be draped on the preform as necessary to cover the upper surface of the preform.

Figure 4:
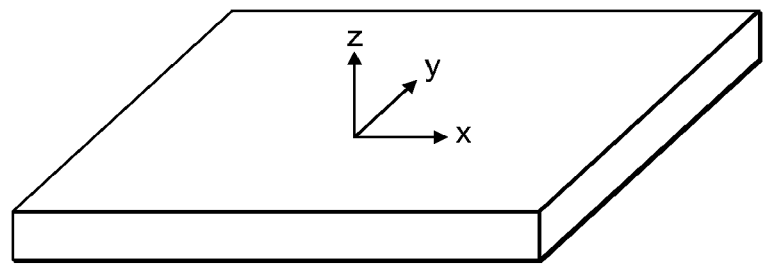
FIG. 4 is a schematic showing the co-ordinate system referred to in the following description.

A vacuum is then generated inside the mould cavity (which is sealed at the mould edges, not shown for clarity) to remove excess air from the fibre preform inside the mould. The vacuum is generated via a vacuum pump 65 and is monitored at a vacuum gauge 75. The mould 50b is then clamped over mould 50a to seal the preform and resin layer inside the mould halves. A compression moulding tool or press 70, such as is used in the Sheet Moulding Compound (SMC) process, is used to apply pressure to the mould and its contents, as shown schematically in FIG. 2. The mould is heated to a pre-determined temperature prior to manufacture of the structural composites component. The mould is heated and its temperature is regulated by a mould heating system 80 that in the embodiment shown in FIG. 2 consists of holes drilled into the solid metal mould, into which a heating medium is supplied. The temperature of the heating medium is regulated in order to keep the mould at the desired temperature, as described further below. The heat and pressure serve to melt the resin film, reducing its viscosity such that it flows downwards into the fibre preform below it. As the resin flows primarily only through the Z-plane of the fibre preform according to the co-ordinate system shown in FIG. 4 and not as much through the X and Y planes, the process is much quicker than RTM. The process is even quicker due to the high pressure that can be applied by the compression moulding tool—100-300 MPa is typical, with an exemplary embodiment operating at approximately 200 MPa. This entire process may take approximately five minutes to complete, even for components of complex shape.

Advantageously, the mould halves are maintained at a constant set temperature throughout the moulding process and also inbetween consecutive mouldings by the mould heating system 80, since there is no need to cool the mould to either lay-up a combined resin and fibre laminate as in a traditional pre-preg moulding process or to prevent pre-installed resin film from flowing prematurely before the lay-up process is completed. The temperature will depend on the specific type of resin but is typically between 80° C. and 180° C. In an embodiment, the temperature range is 120° C. to 150° C. Although the resin undergoes an exothermic reaction during the compression moulding step and generates heat as it cures, the heat is moderated by the mould heating system thus the mould does not heat up above its set temperature. For a solid metal mould, the mould heating system typically consists of a heating circuit drilled into the solid metal. For a thin metal mould, the heating system typically consists of one or more copper pipes to form a circuit that is soldered or otherwise affixed to the back of the mould. In either embodiment, a heated fluid or pressurised water or oil is pumped around the circuit to heat the tool. The temperature of the mould is set and controlled by regulating the temperature of the heating fluid within the circuit at a controller 85, represented schematically in FIG. 2.

This feature of the invention means that once the compression moulding step has been completed, the mould can be opened, the cured component can be removed from the mould, and the mould can be re-used almost immediately without needing it to be cooled first, as would be necessary with prior art high fibre volume fraction processes, minimising the cycle time for moulding and curing the composites component.

Figure 3:
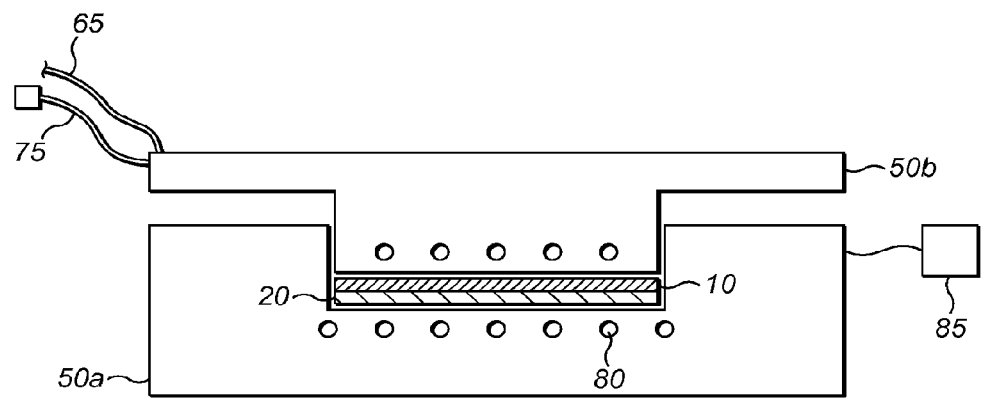
FIG. 3 is a schematic representation of a further embodiment of the invention in which the resin layer has been inserted into the mould prior to the net-shape preform.

In an alternative embodiment, the resin film 20 may be added to the mould prior to the insertion of the fibre preform 10 as seen in FIG. 3, although the skilled man will appreciate that better results may be achieved in adding the fibre preform to the mould first as this gives the user a slightly longer time in which to drape the film inside the mould. Alternatively, the resin film may be draped over the preform prior to inserting the assembled perform/film into the mould in order to speed up the process further.

Figure 5:
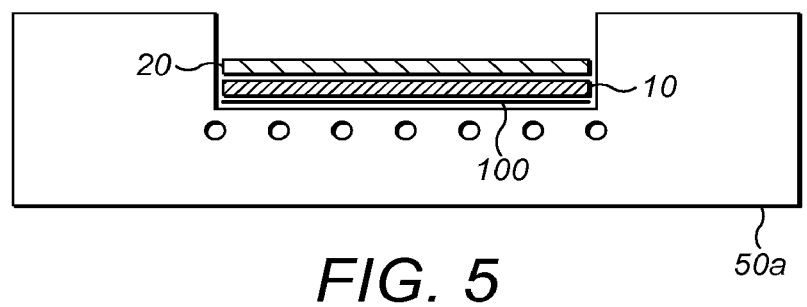
FIG. 5 is a schematic of a variation of the first embodiment.

The above embodiments describe the production of structural composites components in which the surface finish is not important since the component will not be in view during use. However, should a cosmetic surface be required, a surface resin layer of film 100 can be inserted into the mould prior to the addition of the resin layer 10 or the fibre preform 20, as shown schematically in FIG. 5. Surface resin layers are known in the art and do not infuse through the fibre-preform upon heating due to a scrim layer that prevents it from doing so. As such, the surface resin layer, once cured, lies on the surface of the component to produce a smooth shiny surface finish.

It will be apparent to the skilled man that variations may be made to the above embodiments without departing from the invention as defined in the accompanying claims.

The invention claimed is:

1. A method of manufacturing a structural composites component in a single mould comprising first and second mould halves, the method comprising the steps of:
   providing a fibre or fabric preform;
   providing a resin film that is separate from the preform;
   inserting one of the preform or the resin film into the first mould half of the single mould;
   separately inserting the other of the preform or the resin film into the first mould half such that the one of the preform or the resin film is disposed on top of the other of the preform or the resin film in the first mould half;
   closing the second mould half over the first mould half; and
   pressurizing the single mould in a compression press to cause the resin film to impregnate the preform;
   wherein the single mould is maintained at a constant heated temperature throughout the method of manufacture and forms a finished structural composites component in the single mould.

2. The method of claim 1, wherein the preform is placed in the mould prior to disposing the resin film on top thereof.

3. The method of claim 1, wherein the resin layer is disposed on the preform prior to inserting the assembled preform and resin film in the mould.

4. The method of claim 1, wherein the step of maintaining the mould at a constant temperature is carried out using a mould heating system.

5. The method of claim 1, wherein the step of pressurizing takes place at a pressure of 100-300 bar (10 MPa-30 MPa).

6. The method of claim 1, wherein prior to adding one of the resin film or preform into the composites mould, a surface resin layer is inserted into the mould.

7. A method of consecutively manufacturing a first structural composite component and a second structural composite component in a single mould comprising a first mould half and a second mould half, the method comprising:
   providing a first fibre or fabric preform;
   providing a first resin film separate from the first preform;
   inserting one of the first preform or the first resin film into the first mould half;
   separately inserting the other of the first preform or the first resin film into the first mould half such that the one of the first preform or the first resin film is disposed on top of the other of the first preform or the first resin film in the first mould half;
   closing the second mould half over the first mould half;
   pressurizing the single mould in a compression press to cause the first resin film to impregnate the first preform; and
   removing the first structural composites component from the single mould;
   wherein the single mould is maintained at a constant heated temperature throughout the method of manufacture and forms a finished structural composites component in the single mould.

8. The method of claim 7, further comprising maintaining the mould at the constant heated temperature while the mould is empty in between the manufacture of the first structural composites component and the second structural composites component.

9. The method of claim 7, further comprising
   providing a second fibre or fabric preform;
   providing a second resin film separate from the second preform;
   inserting one of the second preform or the second resin film into the first mould half;
   separately inserting the other of the second preform or the second resin film into the first mould half such that the one of the second preform or the second resin film is disposed on top of the other of the second preform or the second resin film in the first mould half;
   closing the second mould half over the first mould half; and
   pressurizing the mould in a compression press to cause the second resin film to impregnate the second preform; and
   removing the second structural composites component from the mould;
   wherein the mould is maintained at a constant heated temperature throughout the method of manufacture.

10. The method of claim 9, wherein the first preform and the second preform are placed in the mould prior to disposing the first resin film or the second resin film, respectively, on top thereof.

11. The method of claim 9, wherein the first resin layer and the second resin layer are disposed on the first preform or the second preform, respectively, prior to inserting the assembled first preform and first resin film or the second preform and the second resin film, respectively, in the mould.

12. The method of claim 9, wherein the step of maintaining the mould at a constant temperature is carried out using a mould heating system.

13. The method of claim 9, wherein the step of pressurizing takes place at a pressure of 100-300 bar (10 MPa-30 MPa).

14. The method of claim 9, wherein prior to adding one of the first or second resin film or the first or second preform into the composites mould, a surface resin layer is inserted into the mould.

15. The method of claim 1, wherein the constant temperature is between 80° C. and 180° C.

16. The method of claim 15, wherein the constant temperature is between 120° C. and 150° C.

17. The method of claim 4, wherein while pressuring the mould in a compression press, a resin of the resin film undergoes an exothermic reaction to cure, and the mould heating system moderates a heat produced by the exothermic reaction to maintain the constant temperature.

18. The method of claim 1, wherein the resin film includes a exothermically-cured resin.

19. The method of claim 1, wherein the resin film comprises a thermosetting resin.

20. The method of claim 1, further comprising melting the resin film to reduce its viscosity such that it flows into the fibre or fabric preform.

21. The method of claim 1, further comprising regulating the temperature with a mould heating system.

* * * * *